United States Patent [19]

Mensink

[11] Patent Number: 5,135,169
[45] Date of Patent: Aug. 4, 1992

[54] SELF-CLEANING FEED DISTRIBUTING DELIVERY DEVICE FOR GLASS MELTERS

[76] Inventor: Daniel L. Mensink, 155 Gatewood Dr., Aiken, S.C. 29801

[21] Appl. No.: 641,826

[22] Filed: Jan. 16, 1991

[51] Int. Cl.$^5$ .................. B05B 15/02; B05B 7/06
[52] U.S. Cl. .................. 239/117; 239/106; 239/123; 239/132.3; 239/420; 239/424; 239/427.3
[58] Field of Search ............ 239/106, 114, 115, 116, 239/117, 123, 132, 132.3, 420, 424, 427.3, 430, 431, 433

[56] References Cited

U.S. PATENT DOCUMENTS

| | | | |
|---|---|---|---|
| 3,074,257 | 1/1963 | Searight | 264/12 |
| 3,133,805 | 5/1964 | Robinson | 65/142 |
| 3,150,947 | 9/1964 | Bland | 264/12 |
| 3,282,066 | 11/1966 | Searight | 264/12 |
| 3,346,190 | 10/1967 | Shepherd | 239/132.3 |
| 3,361,549 | 1/1968 | Nakajima | 65/21 |
| 3,379,428 | 4/1968 | Dortenzo et al. | 239/132.3 |
| 3,531,050 | 9/1970 | Abraham et al. | 239/427.3 |
| 3,558,063 | 1/1971 | Goff | 239/431 |
| 3,719,733 | 3/1973 | Rakestraw et al. | 264/9 |
| 3,771,929 | 11/1973 | Hellman et al. | 425/7 |
| 4,384,846 | 5/1983 | Waldhofer | 239/132.3 |
| 4,401,609 | 8/1983 | McGarry et al. | 264/11 |
| 4,502,633 | 3/1985 | Saxon | 239/424 |
| 4,544,095 | 10/1985 | Litzén | 239/424 |
| 4,616,784 | 10/1986 | Simmons et al. | 239/404 |

FOREIGN PATENT DOCUMENTS

| | | | |
|---|---|---|---|
| 863188 | 9/1981 | U.S.S.R. | 239/106 |
| 1388101 | 4/1988 | U.S.S.R. | 239/117 |

*Primary Examiner*—Andres Kashnikow
*Assistant Examiner*—William Grant
*Attorney, Agent, or Firm*—Harold M. Dixon; William R. Moser; Richard E. Constant

[57] ABSTRACT

A self cleaning, plug resistant, adjustable parameter feed distributing and delivery apparatus for a glass melter comprising a housing with a passage therethrough for a glass slurry, a cold finger within the passage for creating a dispersion pattern of the slurry, a movable slotted tube for controlling the confluence of air propellant and slurry in the passage, and a plurality of ribs that extend through the slots in the slotted tube to urge the slurry forward if it becomes stuck or resists forward movement. Coolant passages in the housing and the cold finger maintain the slurry temperature below that of the melter plenum. The cold finger is axially movable to adjust the dispersion pattern to the desired consistency. Other design features of size can be applied for use in situations requiring different parameters of pattern, particle size, rate, and feed consistencies. The device utilizes air as both a propellant and a surface cleansing mechanism. Other fluids may be used as propellants where process compatibility requires.

19 Claims, 3 Drawing Sheets

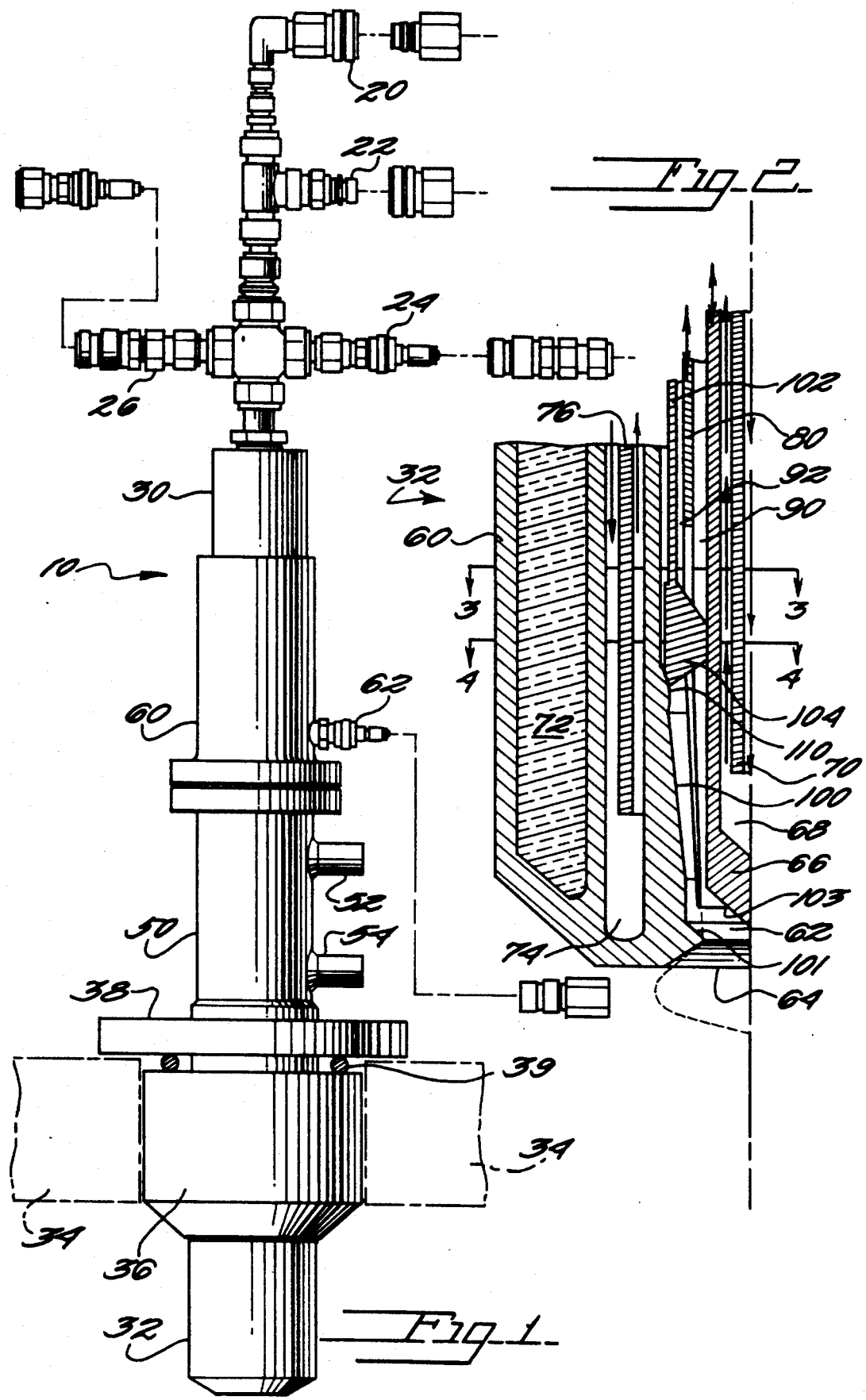

SELF-CLEANING FEED DISTRIBUTING DELIVERY DEVICE FOR GLASS MELTERS

BACKGROUND OF THE INVENTION

1. Field of the Invention

The present invention relates to devices for delivering feed materials to glass melters. In particular, the present invention relates to distributing or dispersing feed slurries in the form of fine globules for improved melter performance. The United States Government has rights in this invention pursuant to Contract No. DE-AC09-89SR18035 between the U.S. Department of Energy and Westinghouse Savannah River Company.

2. Discussion of Background

At the Savannah River Site materials to be vitrified are delivered to glass melters in the form of a slurry consisting of finely divided glass frit that is slurried with waste liquids or other solids which are also finely divided. The gel-like slurry feed is delivered to the melter with a pump and is flowed vertically downward through a 0.188 diameter inch tube which is insulated and water cooled. Upon exiting the tube the feed drops, undivided, onto the surface of the melt within an enclosed vessel.

The interior environment of a glass melter is very dynamic thermally. The glass is melted by internal joule heating generated by current supplied by electrodes submerged beneath the surface. Molten glass product is discharged periodically or at a gradual rate to molds, and new glass in the form of slurry feed is added to replace that which is discharged. Some heat is unavoidably lost by the discharge of molten glass. Additionally heat losses also occur through removal of off-gas via the melter plenum. Cooler plenum temperatures cause a crust or "cold cap" to form on the molten glass. A uniform cold cap insulates the molten mass, assists melting, and provides thermal damping necessary for stable melter operation.

The feed to the melter may be modified with additives that improve the glass for use as a waste encapsulating medium. Vitrified waste products can consist of fillers, dopants, coloring agents, additives and waste materials incorporated into a glass matrix by combining the material with glass frit, feeding the slurried combination to the glass melter, melting the glass with the mixed material, and then discharging the composite into a mold. Frequently, however, the slurry feed and sometimes impurities and additives in the feed can further increase the dynamics of the melter environment. The flowing agent in the slurry, usually water, rapidly flashes to steam upon contacting the melt. The waste and other additives may themselves be combustible.

Presently, when feed is dropped in a continuous stream of slurry onto the cold cap, the uniformity of the cap can be disrupted. Often voids result in the cold cap through which heat is lost unnecessarily. This phenomenon is assisted by the rapid combustion and vaporization of organics, water and other volatiles, contained within the feed, upon contact with the hot melt surface. In some instances entrained vapor results in glass foaming within the melter. By distributing the feed evenly in the form of divided droplets across the melt, cold cap integrity is preserved, heat usage is maximized and a greater degree of control is lent to melter operation. In divided form, organics and moisture can be combusted and or vaporized in the melter plenum prior to arrival at the cold cap. This prevents of cold cap disruptions and also reduces direct glass entrainment into the off-gas due to spattering from rapid vaporization at the melt surface.

Additionally, divided feed delivery increases the available surface area of the fed mass during its residence within the plenum. This suggests that existing heaters within the plenum space, which are presently limited in use to providing start-up and trim heating, can now be more productively applied to glass melting. This effect would represent additional heating capacity to that already available by present joule heating and an increase in melter rate capacity is expected.

However, if the feed is too finely atomized, the feed particles themselves can become directly entrained in the off gas and exit the melter through the off-gas system without being melted.

Melter feed devices are also prone to plugging. Plugs readily occur at the exiting tip due to drying out and sinter of the feed material on tip surfaces. The plugs are difficult to remove because they are hard, strong, insoluble, and bond tightly to tip surfaces.

Presently, two strategies for avoiding plugs are employed. The first is to reduce the exit area in combination with feeding to affect an uninterrupted and rapid feed velocity at the tip sufficient to avoid the onset of drying. This method is not effective during periods in which reduced feed rates are dictated by melter dynamics. Additionally, the resulting small orifice size significantly reduces the ability to remove plugs. Plugging under low flow conditions has been experienced even when periodic steam and water purges have been employed. The second strategy is to increase the fraction of water within the feed to reduce the tackiness of the feed and make it less prone to drying. In addition to a higher vapor load to the off-gas system, this method requires more heat per pound of feed, and increases vapor flashing within the melter which results in reduced cap integrity and glass foaming.

A feed implement for a glass melter must be capable of distributing feed in a particle size that is not too small nor too large, to avoid entrainment of feed in the off-gas and enhance cold cap integrity. It must be capable of accommodating glass frit in a slurry, perhaps with a second material or additive carried by the slurry, with low percent water ratios to reduce vapor volatility. It must distribute the feed evenly across the melt surface to maximize cold cap integrity and uniformity. It must function in a dynamic environment without fouling. It must not plug, and it must provide means for removing plugs easily should they occur. Additionally, it must be able to withstand oxidation, sulfudation and creep of components at high temperatures (700 C.) encountered in the melter plenum.

U.S. Pat. No. 4,616,784 issued to Simmons, et al. in 1986 describes a nozzle for atomizing coal-water slurries. A test apparatus utilizing a device as described in this patent was tried in small 100th scale glass melters at the Savannah River Laboratory. However, it atomized the feed into too small of particles, used excessive quantities of air propellant, and did not lend well to scale-up for larger melters, and required significant work and disassembly for correcting plugged and fouled conditions.

SUMMARY OF THE INVENTION

According to its major aspects, the present invention is a device that delivers and evenly distributes a slurry to a melter, such as a glass melter. The device can be adjusted to produce divided particles in various sizes, from fine to coarse, in narrow to wide circular patterns. The device resists plugging and has direct means for removing plugs should they occur.

The device comprises a hollow external housing having a through passage, an inlet and an exit. A water cooled cylinder or "cold finger" is positioned in the center of the passage and a slot bearing tube surrounds the cold finger. The cold finger defines an annulus in the passage and the slot bearing tube defines two zones in that annulus, a first zone for the slurry to flow through and a second zone for a propellant fluid such as air to flow through. The slot bearing tube is so named due to a collet-like fitting attached to its end. The collet has a plurality of slots in it so that the slurry feed zone and the air propellant zone are in communication. However, the cross section of each slot narrows toward the exit and the propellant fluid is under a relatively greater pressure than the slurry so that the propellant flows through the slots, mixes with the slurry, and accelerates the slurry through the slots to the exit and outward into the melter.

To urge the slurry forward, should it become stuck or resist forward movement in the passage, a plurality of ribs are positioned in the second zone, each rib extending from the air passage to the slurry zone through one of the slots. The slotted tube can be moved vertically along it's center axis so that the ribs run in interference within the slots and beyond the open ends of the slots so as to dislodge slurry material that may plug the slots. The cold finger is also vertically movable to adjust the dispersion pattern, particle size and velocity of the expelled slurry and to cooperate with the housing, cold finger and the slotted tube in particular in order to accelerate the slurry as it approaches the passage exit by changing the passage cross section.

Both the housing and the cold finger have coolant passages to keep the temperature of the slurry relatively low so that the liquid component of the slurry does not evaporate or boil off.

The plurality of ribs is a feature of the present invention. The ribs urged the slurry forward and dislodge slurry that might be sticking within the slots without the need to take the device off-line.

Another feature of the present invention is the slotted tube. The tube, equipped with the collet-like fittings separates the propellant fluid and the slurry partially so that the intermixing of the two is better controlled. The slots serve two functions: they allow the propellant fluid to cross into the first zone from the second zone and thereby mix with the slurry and they provide penetrations for the ribs to extend therethrough. Moreover, the slotted tube rather than the ribs are movable so that the amount of fluid mixing with the slurry can be adjusted while the slurry can still be dislodge by relative movement of the ribs and tube.

Another feature of the invention is the use of a propellant fluid. A constant flow of propellant such as air through the air passage prevents the accumulation of feed on tip surfaces and in the slots, thereby enabling the apparatus to remain free of slurry plugging, even during conditions of low feed flow.

Another feature of the invention is the ability to vary feed exit velocity, particle size, pattern width and density via the simple size changes to existing features such as: 1) the flow rate of the propellant; 2) the slope of exit surfaces in the housing and cold finger; 3) the width of the slots; 4) the number of slots; 5) the diameter of the exit opening; and 6) the axial position of the cold finger.

Still another feature of the present invention is the cold finger with its internal coolant passage and axial adjustability. The cold finger coolant system helps to keep the slurry dilute by maintaining slurry temperature below that of the melter plenum and accelerates the slurry forward to a proper dispersion pattern given the particular characteristics of the slurry.

Other features and advantages will be apparent to those skilled in the art from a careful reading of the Detailed Description of a Preferred Embodiment accompanied by the appended drawings.

BRIEF DESCRIPTION OF THE DRAWINGS

In the drawings,

FIG. 1 is a side view of the feed delivery device according to a preferred embodiment of the present invention;

FIG. 2 is a detailed view of the feed delivery device nozzle according to a preferred embodiment of the present invention;

DETAILED DESCRIPTION OF A PREFERRED EMBODIMENT

Figure 3:
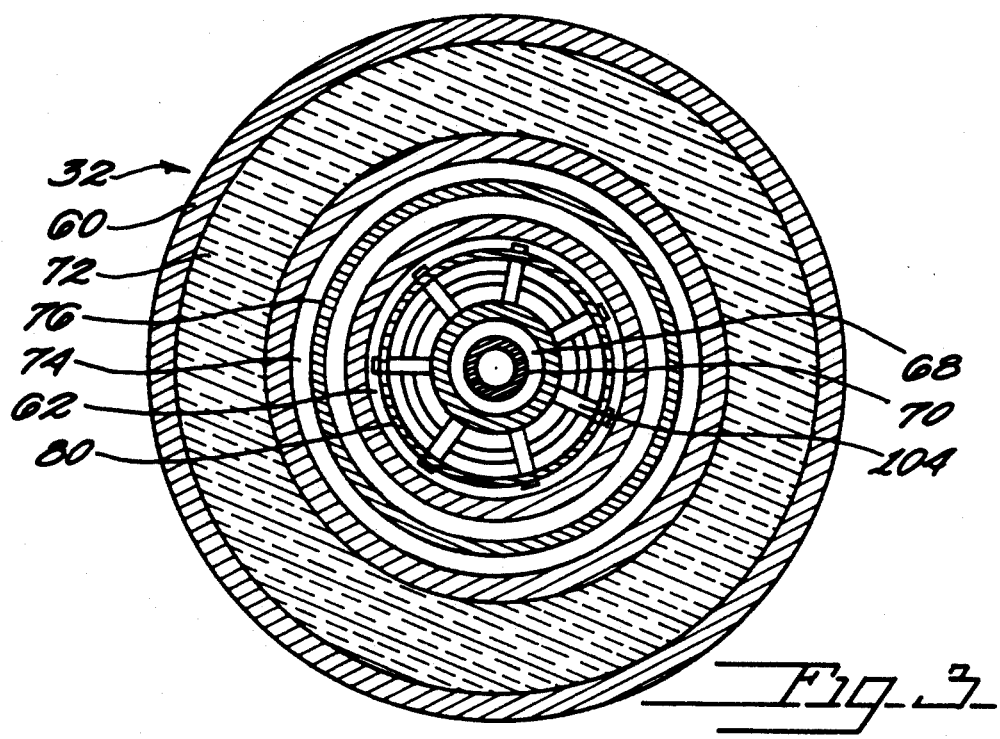
FIG. 3 is a cross sectional view of the feed nozzle along lines 3—3 of FIG. 2.

Referring now to FIG. 1, the distributor of the present invention is generally indicated by the reference character 10. The distributor comprises a series of inlet and exit ports for providing feed material and coolant, a feed nozzle and an air cylinder. Port 20 is a first coolant inlet port and port 22 a first coolant exit port. A slurry inlet port 24 receives the slurry, while, on the opposite side of distributor 10 is a flush water inlet port 26 for washing slurry from its passage interior to distributor 10. Each port 20, 22, 24 and 26 has a fitting of conventional design to allow connection to sources of water or slurry, but preferably fittings that permit quick connection such as a "SWAGELOK". Each inlet leads to a passage within distributor 10.

An air cylinder 30 is next in line in distributor 10. Air cylinder 30 moves two components in a nozzle 32 at the end of distributor 10. Nozzle 32 extends into a melter 34 just within its plenum. Distributor 10 engages melter at flange 38. Distributor 10 is electrically isolated from melter 34 by non-conductive gasket 39 and electrical insulator 36, preferably a ceramic insulator such as "MACOR" by Dow Corning, and rests on flange 38.

Above flange 38 is a mid-section 50 having a second inlet coolant port 52 and a second coolant exit port 54. Above mid-section 50 is upper section 60 which has an air inlet port 62, also preferably having a quick connect fitting.

Figure 4:
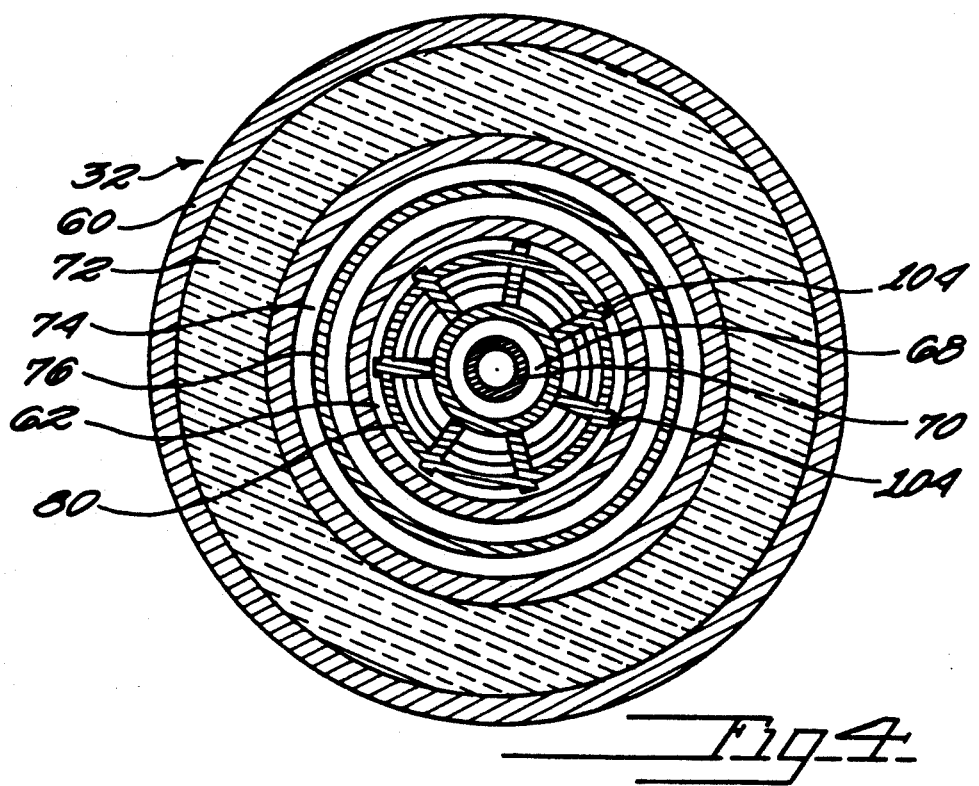
FIG. 4 is cross sectional view of the feed nozzle along lines 4—4 of FIG. 2.
Figure 5:
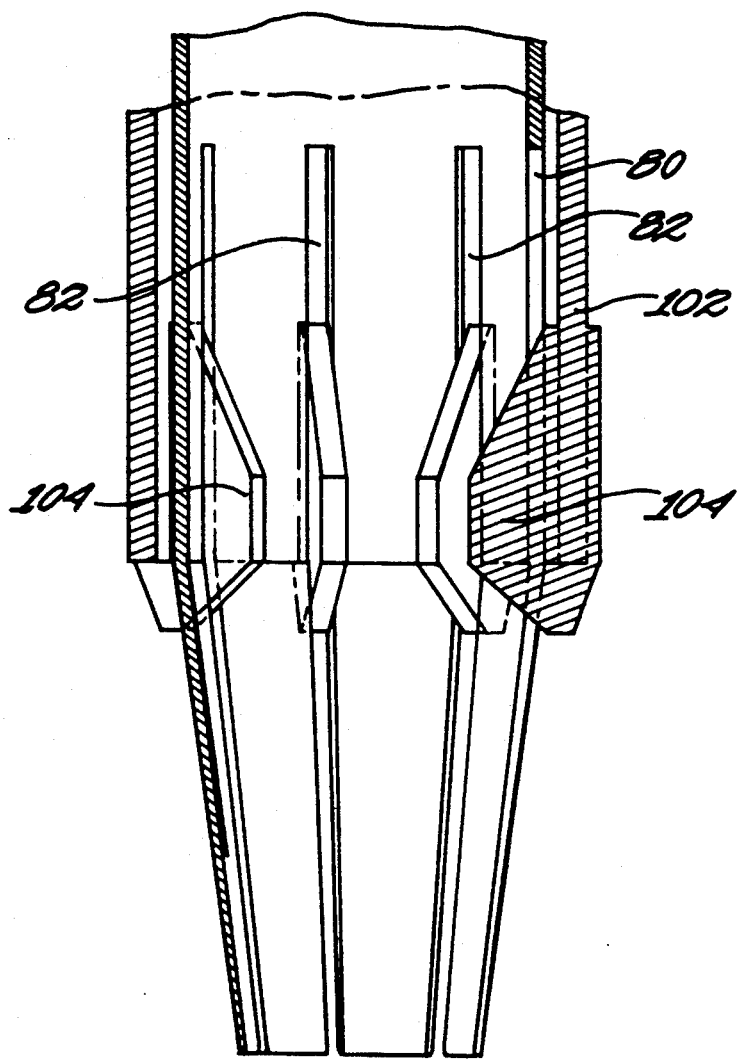
FIG. 5 is a detailed cross sectional view of the slotted tube and rib arrangement according to a preferred embodiment of the present invention.

FIG. 2 shows a cross section of nozzle 32 from its central, longitudinal axis outwardly, it being understood that nozzle is generally annularly symmetric; that is, the features of nozzle 32 are not changed by rotation from that illustrated in FIG. 2 except as will be noted below. FIGS. 3 and 4 show cross sectional views of nozzle 32 along lines 3—3 and 4—4 respectively.

Referring now to FIGS. 2, 3, and 4, nozzle 32 comprises a housing 60 with a passage 62 leading to the exit 64 of nozzle 32. Housing 60, being inside the melter plenum should be made of a high temperature oxidation and sulfudation resisting material such as "INCONEL Alloy 690". Inside passage 62 is a cold finger 66 the function of which will be described more fully below. Cold Finger 66 has a first coolant passage 68, the inlet and exit sides of which are defined by first coolant passage wall 70, with the direction of flow indicated by arrows. The inlet and exit sides of passage 68 communicate directly with first coolant inlet port 20 and first coolant exit port 22, respectively.

An annular region 72 of housing 60 contains thermal insulation to help insulate the aqueous slurry from the temperature of the plenum, which is on the order of 700 or more degrees Celsius. Preferably the insulation is a refractory ceramic fiber. Radially inward of annular region 72 is a second coolant passage 74, the inlet and exit sides of which are defined by second coolant passage wall 76. The direction of coolant flow in the second coolant passage is also indicated by arrows. The inlet and exit sides of second coolant passage communicate directly with second coolant inlet port 52 and exit port 54, respectively.

Inside passage 62 is a slotted tube 80 having a plurality of slots 82 oriented parallel to the axis of slotted tube 80. In the FIGS. 3 and 4, seven slots are shown. Slotted tube 80 separates passage 62 into two zones, a first zone 90 for the slurry and a second zone 92 for a propellant fluid, such as air. The slurry and air zones 90 and 92 communicate through slots 82.

A slurry, introduced in slurry inlet port 24, flows through slurry passage 90, air, introduced at air inlet port 62 flows through air passage 92. Part of the air crosses slotted tube 80 through slots 82 and combines and accelerates slurry toward exit 64. The air flow rate does not have to be large but is adjusted to obtain the dispersion desired. The interior wall 100 of passage 62 cooperates with the exterior of cold finger 66 to further accelerate the flow of slurry toward exit 64 and to disperse the slurry on leaving the exit. The cooperation is achieved by a progressive narrowing of the cross section of passage 60 toward exit 64, followed by a widening of the cross section at exit 64. A narrowing of approximately 20% of the area of passage 60 is sufficient. Furthermore, cold finger 66 is movable axially, to allow adjustment of the distribution and globule size exiting nozzle 32.

At exit 64, the slope 101 of interior wall of passage 62 cooperates with the slope 103 of the exterior of cold finger 66 to direct the flow of slurry radially outward upon exiting 64 so as to dictate the size of the resulting pattern of distribution on the melt surface.

In second zone 92 is a cylinder 102 lying radially outward of slotted tube 80 and inward of housing 60 and spaced apart from both. At the end of cylinder 102 is a plurality of ribs 104 attached thereto and oriented so that ribs 104 fit into slots 82 and extend into and across first zone 90. Seven ribs 104, the only feature of FIGS. 2, 3, and 4 that is not annually symmetric, are shown. Ribs 104 are preferably somewhat trapezoidal in shape, with the lowermost face towards the exterior of cold finger 66, so that slurry material in slots 82 is directed toward cold finger 66 and away from second zone 92 during the upward actuation of air cylinder 30. Ribs 104 engage a stepped portion of the interior of housing at 110 and except for withdrawal for disassembly or repair, are not moved. Rather, slotted tube 80 is moved along with cold finger 66 by air cylinder 30. Air cylinder 30 and slots 82 are sized so that slotted tube 80 can move up or down far enough so that ribs will dislodge and urge forward any slurry that becomes stuck or resists movement from slots 82. FIG. 5 illustrates the relative motion of slots 82 of slotted tube 80 and ribs 104 of cylinder 102 in a cross section of slotted tube 80 and cylinder 102. Ribs 104 extend through slots 82 from second zone 92 to first zone 90. Ribs become smaller toward first zone so that either upward or downward motion of ribs 104 relative to slotted tube 80 will move slurry inwardly. The number of ribs and slots can be other than seven, as illustrated, but most preferably of an odd number in order to avoid collision of axially opposite exiting streams.

First and second coolant passages 68 and 74 cooperate to keep the slurry cool with respect to the plenum temperature. Ideally, temperatures near or above 100 degrees Celsius should be avoided in aqueous slurries. If the slurry becomes too hot, the liquid component, such as water, will boil off and cause the slurry to thicken and stick, followed by drying and sintering into a plug.

Depending on the capacity of the melter, more than one distributor 10 may be used, rather than one larger one, in order to achieve good dispersion throughout the interior. One distributor can deliver approximately five liters of slurry per hour. However the capacity can be adjusted upward or downward by sizing modifications and scaling of the present features.

Ideally, cold finger 66 and slotted tube 80 should be moved so that, given the flow rate, the dispersion of slurry is in the form of a uniform distribution of droplets, approximately 5–25 mm. Droplets will fall evenly across the cold cap rather than be entrained in the off gas but will not disturb the insulating cap. The correct dispersion requires a balancing of the flow rates of slurry and air, the positions of the torpedo and slotted tube, and to some extent will be a function of the composition of the slurry, itself.

It will be apparent to those skilled in the art of atomization of feeds that other changes and additions can be made without departing from the spirit and scope of the present invention, which is to be defined by the appended claims.

What is claimed is:

1. A device for delivery of a slurry, the device comprising:

a housing having a passage formed therein, said passage having an inlet and an exit for said slurry to flow therethrough;

means within said passage for defining a first zone and a second zone within said passage, said first zone generally confining said slurry, said second zone having a fluid flowing therethrough;

a plurality of slots formed within said defining means for allowing communication between said first zone and said second zone and said fluid is under relatively greater pressure than said slurry so that said fluid moves through said slots from said second zone to said first zone means for accelerating said slurry flowing in said passage and through said exit; and a plurality of ribs for dislodging portions of said slurry from said first zone, each of said ribs extending through one of said slots from said second zone to said first zone and movable relative to said defining means, whereby said ribs interrupt portions of said slurry.

2. The device as recited in claim 1, wherein said accelerating means further comprises a cold finger positioned within said passage, said cold finger cooperating with said housing so that said passage has a smaller cross sectional area at said exit than at said inlet.

3. The device as recited in claim 1, wherein said accelerating means further comprises a cold finger positioned within said first zone, said cold finger cooperating with said defining means so that the cross sectional area of said passage is smaller at said exit than at said inlet.

4. A device for delivering a slurry to a melter, said device comprising:
   a housing having a passage formed therein, said passage having an inlet and an exit;
   a cold finger positioned within said passage and defining an annulus in said passage thereby, said cold finger and said housing cooperating so that said annulus has a smaller cross section at said exit than at said inlet;
   means for defining a first and a second annular zone within said annulus, said first annular zone for receiving said slurry and said second annular zone for receiving a fluid,
   said defining means having a plurality of slots therein so that said first and second annular zones communicate, said fluid being under pressure so that some of said fluid flows through said slots from said second annular zone to said first annular zone and accelerates the flow of said slurry from said passage;
   means for urging said slurry from said exit of said first annular zone if said slurry resists said fluid; and wherein said urging means further comprises:
   a plurality of ribs, each of said ribs extending through one of said slots from said second zone to said first zone and movable relative to said defining means, whereby said ribs interrupt portions of said slurry.

5. The device as recited in claim 4, wherein said slurry forms a dispersion pattern and further comprising means for moving said cold finger axially to adjust said dispersion pattern.

6. The device as recited in claim 4, further comprising means for moving said defining means axially so that said defining means moves axially with respect to said ribs in said slots.

7. A device for delivering a slurry to a melter, said device comprising:
   a housing having a passage formed therein, said passage having an inlet and an exit;
   a cold finger positioned within said passage and defining an annulus in said passage thereby, said cold finger and said housing cooperating so that said annulus has a smaller cross section at said exit than at said inlet;
   a tube within said passage and exterior to said cold finger, said tube defining a first and a second annular zone within said annulus, said first annular zone for receiving said slurry and said second annular zone for receiving a fluid,
   said tube having a plurality of slots therein so that said first and second annular zones communicate, said fluid being under pressure so that some of said fluid flows through said slots from said second annular zone to said first annular zone and accelerates the flow of said slurry from said passage; and
   a plurality of ribs extending from said second zone to said first zone, each of said ribs through one of said slots, said ribs moving relative to said tube so that said ribs interrupt a portion of said slurry and dislodge it from said first zone.

8. The device as recited in claim 7, wherein said housing further comprises first means for cooling said housing.

9. The device as recited in claim 7, wherein said cold finger further comprises means for cooling said cold finger.

10. The device as recited in claim 7, wherein said slurry forms a dispersion pattern upon exiting said device and further comprising first means for moving said cold finger in the vertical direction to adjust said dispersion pattern.

11. The device as recited in claim 7, further comprising means for moving said tube vertically so that said ribs move vertically in said slots.

12. The device as recited in claim 7, wherein said ribs are formed so that any of said portion of said slurry is pushed away from said tube when said ribs move relative to said tube.

13. The device as recited in claim 7, wherein said housing further comprises means for cooling said housing and wherein said cold finger further comprises means for cooling said cold finger.

14. The device as recited in claim 7, wherein said housing further comprises means for cooling said housing and wherein said slurry forms a dispersion pattern upon exiting said device, said device further comprising means for moving said cold finger in the vertical direction to adjust said dispersion pattern.

15. The device as recited in claim 7, wherein said housing further comprises means for cooling said housing and said device further comprises means for moving said tube vertically so that said ribs move vertically in said slots.

16. The device as recited in claim 7, wherein said housing further comprises means for cooling said housing and wherein said ribs are formed so that any of said portion of said slurry is pushed away from said tube when said ribs move relative to said tube.

17. The device as recited in claim 7, wherein said cold finger further comprises means for cooling said cold finger and wherein said slurry forms a dispersion pattern upon exiting said device, said device further comprising means for moving said cold finger in the vertical direction to adjust said dispersion pattern.

18. The device as recited in claim 7, wherein said cold finger further comprises means for cooling said cold finger and said device further comprises means for moving said tube vertically so that said ribs move vertically in said slots.

19. The device as recited in claim 7, wherein said cold finger further comprises means for cooling said cold finger and wherein said ribs are formed so that any of said portion of said slurry is pushed away from said tube when said ribs move relative to said tube.

* * * * *